United States Patent
Tomita

(10) Patent No.: US 8,164,826 B2
(45) Date of Patent: Apr. 24, 2012

(54) MULTI-STAGE OPTICAL AMPLIFIER AND METHOD OF CONTROLLING THE SAME

(75) Inventor: Takahiro Tomita, Tokyo (JP)

(73) Assignee: NEC Corporation, Tokyo (JP)

( * ) Notice: Subject to any disclaimer, the term of this patent is extended or adjusted under 35 U.S.C. 154(b) by 533 days.

(21) Appl. No.: 12/048,067

(22) Filed: Mar. 13, 2008

(65) Prior Publication Data
US 2008/0225385 A1 Sep. 18, 2008

(30) Foreign Application Priority Data

Mar. 15, 2007 (JP) ................................. 2007-067347

(51) Int. Cl.
*H01S 3/067* (2006.01)
*H04B 10/17* (2006.01)
*H01S 3/131* (2006.01)

(52) U.S. Cl. ................................ 359/337.4; 359/341.41
(58) Field of Classification Search .............. 359/341.41, 359/341.42, 337.4
See application file for complete search history.

(56) References Cited

U.S. PATENT DOCUMENTS

| | | | | |
|---|---|---|---|---|
| 5,995,274 A | * | 11/1999 | Sugaya et al. ................. | 359/337 |
| 6,025,947 A | * | 2/2000 | Sugaya et al. ................. | 398/97 |
| 6,038,063 A | * | 3/2000 | Tsuda et al. .............. | 359/341.41 |
| 6,055,094 A | * | 4/2000 | Shima et al. .............. | 359/337.11 |
| 6,603,596 B2 | * | 8/2003 | Inagaki et al. ............. | 359/341.4 |
| 2003/0231376 A1 | * | 12/2003 | Horachi et al. ............... | 359/333 |
| 2009/0129785 A1 | * | 5/2009 | Murakami ..................... | 398/160 |

FOREIGN PATENT DOCUMENTS

| | | |
|---|---|---|
| JP | 7-193542 A | 7/1995 |
| JP | 8-111664 A | 4/1996 |
| JP | 10-271094 A | 10/1998 |
| JP | 11-121848 A | 4/1999 |
| JP | 11-122192 A | 4/1999 |
| JP | 11-237520 A | 8/1999 |
| JP | 2000114629 A | 4/2000 |
| JP | 2000151515 A | 5/2000 |
| JP | 2001144692 A | 5/2001 |
| JP | 2003174421 A | 6/2003 |
| JP | 2004247466 A | 9/2004 |
| JP | 2006166478 A | 6/2006 |

OTHER PUBLICATIONS

Chinese Office Action for CN200810083598 issued Nov. 23, 2011.
S. Liguo et al., "Analisys and Design of a Novel Photodetector Amplifier Used for FOCS", Instrumentation technology and sensors, vol. 6. 2001, pp. 28-32.
Japanese Office Action for JP2007-067347 issued Nov. 29, 2011.

* cited by examiner

*Primary Examiner* — Mark Hellner
*Assistant Examiner* — Ari M Diacou

(57) ABSTRACT

The present invention provides a multi-stage optical amplifier including a high SN ratio and a method of controlling the same. A multi-stage optical amplifier is configured such that the gain of an amplifying unit in a first stage is greater than that of an amplifying unit in another stage. Therefore, it is possible to increase signal components that have been reduced due to spontaneously emitted light in the first stage, and thus relatively reduce noise. As a result, the obtained signals including a high SN ratio can be maintained in another stage, and it is possible to obtain a high SN ratio.

1 Claim, 4 Drawing Sheets

F I G. 2
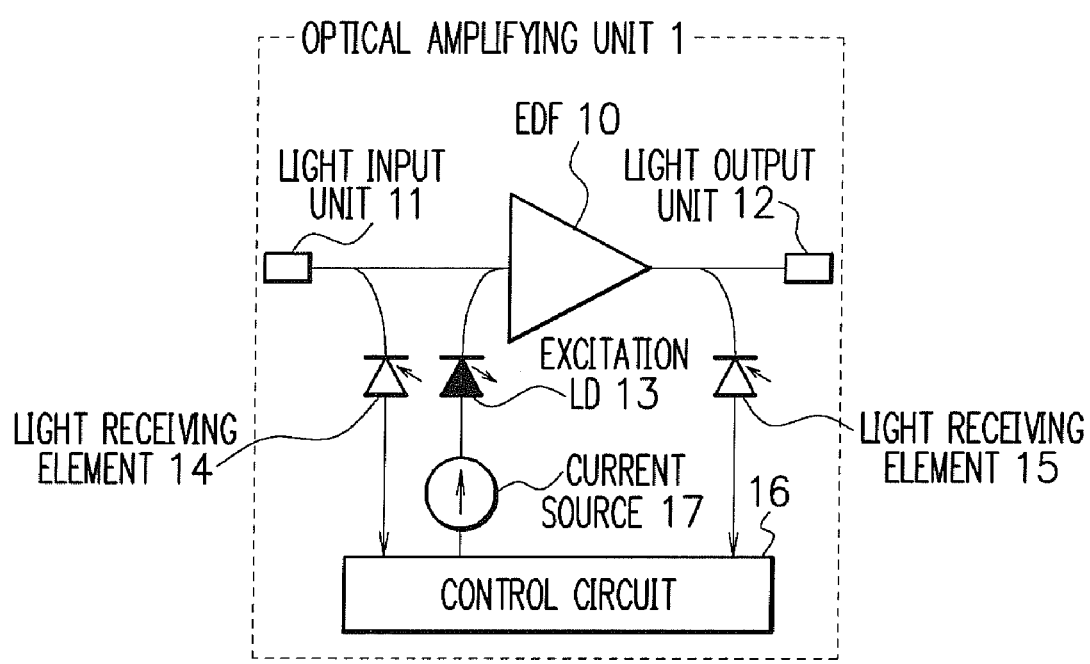

MULTI-STAGE OPTICAL AMPLIFIER AND METHOD OF CONTROLLING THE SAME

This application is based upon and claims the benefit of priority from Japanese patent application No. 2007-067347, filed on Mar. 15, 2007, the disclosure of which is incorporated herein in its entirety by reference.

BACKGROUND OF THE INVENTION

1. Field of the Invention

The present invention relates to a multi-stage optical amplifier and a method of controlling the same.

2. Description of the Related Art

Optical fiber communication is an indispensable technique for point-to-point (which connects computers to networks through telephone lines) transmission or high-speed and high-capacity communication in metro/access networks, and many techniques have been developed for the optical fiber communication.

In recent years, for example, WDM (wavelength division multiplexing) and optical amplifiers have been used to support the optical fiber communication. WDM is a technique that makes the spectrums of optical pulses to be orthogonal to each other on a frequency axis and transmits the optical pulses. The method can considerably increase transmission capacity and be expected to improve the utilization of frequencies. An erbium doped optical fiber amplifier that was put into practical use in 1990s makes it possible to compensate for the loss of an optical fiber periodically and contributes to a considerable increase in transmission distance. An optical amplifier achieved by combining the two techniques includes a function of making the gain in a frequency band constant (Japanese Patent Application Laid-open Nos. 2003-174421 and 2006-166478).

However, spontaneous emission noise generated from the optical amplifier causes problems in achieving high-speed and high-capacity communication. A noise factor is an index indicating the degree of the deterioration of signals due to the spontaneous emission noise.

In general, since the optical amplifier performs total power control, it detects all optical energy, which makes it difficult to discriminate signal light from spontaneous emission noise. As a result, even when the gain of the optical amplifier is controlled to a desired value, it is difficult to control the gain of signal light to a desired value. For this reason, it is necessary to increase the gain in consideration of spontaneous emission noise generated. A spontaneous emission noise correction amount is defined as a parameter for correcting the deterioration of signals due to the spontaneous emission noise. It is possible to make the gain of signal light constant by adding the spontaneous emission noise correction amount to the output power.

Here, the total power is optical output including noise, and the signal light power is optical output without noise.

However, in the multi-stage optical amplifier performing constant gain control in which the gain in each stage is made constant and an output unit corrects the spontaneous emission noise, when the number of wavelengths is small and input power is low, the gain of signal light in the first stage becomes excessively small, and a noise factor deteriorates (an SN ratio is lowered), thereby causing a problem.

SUMMARY OF THE INVENTION

The present invention has been achieved in view of the above-described circumstances. An exemplary object of the invention is to provide a multi-stage optical amplifier including a high SN ratio and a method of controlling the same.

In order to achieve the object, the invention has the following characteristics.

<Multi-Stage Amplifier>

A multi-stage amplifier according to the invention is a multi-stage optical amplifier so that a constant gain can be obtained. In such a amplifier, the gain of an amplifying unit in a first stage is greater than that of an amplifying unit in another stage, thereby preventing an increase in the amount of noise due to reduction in signal components caused by spontaneously emitted light.

A multi-stage amplifier according to the invention is a multi-stage optical amplifier including a plurality of optical amplifying units that are connected in series to one another to obtain a constant gain. An optical amplifying unit in a first stage includes: a rare earth doped optical fiber amplifying circuit; an excitation light source that inputs excitation light to at least one of an input terminal and an output terminal of the rare earth doped optical fiber amplifying circuit; light receiving elements that are connected to the input and output terminals of the rare earth doped optical fiber amplifying circuit; and a control circuit that makes the difference between output signals from the two light receiving elements constant and makes the gain of the optical amplifying unit in the first stage greater than that of an optical amplifying unit in another stage to prevent an increase in the amount of noise due to a reduction in signal components caused by spontaneously emitted light.

Further, a multi-stage amplifier according to the invention is a multi-stage optical amplifier including a plurality of optical amplifying units that are connected in series to one another to obtain a constant gain. Each of the optical amplifying units includes: a rare earth doped optical fiber amplifying circuit; an excitation light source that inputs excitation light to at least one of an input terminal and an output terminal of the rare earth doped optical fiber amplifying circuit; light receiving elements that are connected to the input and output terminals of the rare earth doped optical fiber amplifying circuit; and a control circuit that makes the difference between output signals from the two light receiving elements constant. The control circuit of the optical amplifying unit in a first stage makes the gain of the optical amplifying unit in the first stage greater than that of an optical amplifying unit in another stage to prevent an increase in the amount of noise due to a reduction in signal components caused by spontaneously emitted light.

Further, a multi-stage amplifier according to the invention is a multi-stage optical amplifier including a plurality of optical amplifying units that are connected in series to one another to obtain a constant gain. Each of the optical amplifying units includes: a rare earth doped optical fiber amplifying circuit; an excitation light source that inputs excitation light to at least one of an input terminal and an output terminal of the rare earth doped optical fiber amplifying circuit; light receiving elements that are connected to the input and output terminals of the rare earth doped optical fiber amplifying circuit; and a control circuit that makes the difference between output signals from the two light receiving elements constant. The control circuit of the optical amplifying unit in a first stage changes signal input power and the number of wavelengths on the basis of the initial value of the gain of each optical amplifying unit, sets the gain to the initial value when signal output power is equal to an expected value, increases the gain when the signal output power is less than the expected value, and decreases the gain when the signal output power is more than the expected value, thereby preventing an increase in the amount of noise due to a reduction in signal components caused by spontaneously emitted light.

<Method of Controlling Multi-Stage Amplifier>

A method of controlling a multi-stage amplifier according to the invention is a method of controlling a multi-stage optical amplifier to obtain a constant gain. The method includes increasing the gain of an amplifying unit in a first stage to be greater than that of an amplifying unit in another stage, thereby preventing an increase in the amount of noise due to a reduction in signal components caused by spontaneously emitted light.

Also, a method of controlling a multi-stage amplifier according to the invention is a method of controlling a multi-stage optical amplifier to obtain a constant gain. The method includes allowing a control circuit of an optical amplifying unit in a first stage to change signal input power and the number of wavelengths on the basis of the initial value of the gain of each optical amplifying unit, set the gain to the initial value when signal output power is equal to an expected value, increase the gain when the signal output power is less than the expected value, and decrease the gain when the signal output power is more than the expected value, thereby preventing an increase in the amount of noise due to a reduction in signal components caused by spontaneously emitted light.

BRIEF DESCRIPTION OF THE DRAWINGS

FIG. 2 is a diagram illustrating the detailed structure of an optical amplifying unit 1 shown in FIG. 1;

DESCRIPTION OF THE EXEMPLARY EMBODIMENTS

First Exemplary Embodiment

<Multi-Stage Amplifier>

Figure 1:
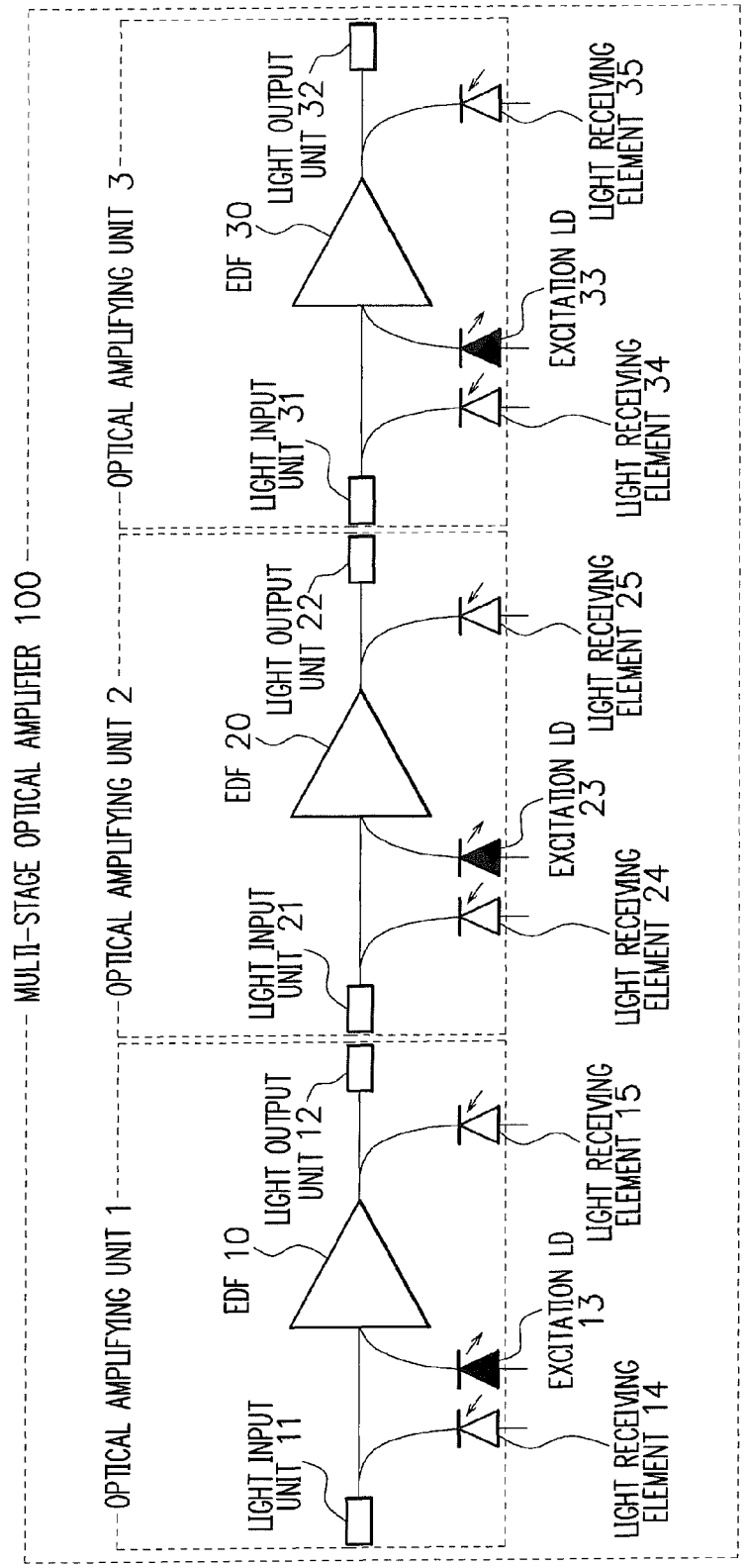
FIG. 1 is a conceptual diagram illustrating an example of a multi-stage optical amplifier according to the invention.

A multi-stage optical amplifier according to a first exemplary embodiment of the invention includes a constant gain, and is characterized in that the gain of an amplifying unit in a first stage is greater than that of an amplifying unit in another stage, thereby preventing an increase in noise due to a reduction in the number of signal components caused by spontaneously emitted light.

According to the above-mentioned structure, since the gain of the amplifying unit in the first stage is greater than that of the amplifying unit in another stage, it is possible to increase the signal components that have been reduced due to spontaneously emitted light in the first stage, and thus relatively reduce noise. As a result, the obtained signals including a high SN ratio are maintained in another stage, and thus it is possible to obtain a high SN ratio.

Second Exemplary Embodiment

<Multi-Stage Amplifier>

A multi-stage optical amplifier according to a second exemplary embodiment of the invention includes a plurality of optical amplifying units connected in series to one another to obtain a constant gain, and is characterized in that the optical amplifying unit in a first stage includes: a rare earth doped optical fiber amplifying circuit; an excitation light source that inputs excitation light to at least one of the input and output terminals of the rare earth doped optical fiber amplifying circuit; light receiving elements that are connected to the input and output terminals of the rare earth doped optical fiber amplifying circuit; and a control circuit that makes the difference between output signals from the two light receiving elements constant and makes the gain of the optical amplifying unit in the first stage greater than that of an optical amplifying unit in another stage to prevent an increase in the amount of noise due to a reduction in the number of signal components caused by spontaneously emitted light.

In this structure, rare earth elements include erbium (Er), praseodymium (Pr), thulium (Tm), and neodymium (Nd). For example, when erbium is used as the rare earth element, an optical signal in a wavelength range of 1.53 to 1.62 µm is amplified. When praseodymium (Pr) is used as the rare earth element, an optical signal in a wavelength of about 1.3 µm is amplified. When thulium (Tm) is used as the rare earth element, an optical signal in a wavelength range of about 1.45 to 1.51 µm is amplified.

According to the above-mentioned structure, since the gain of the optical amplifying unit in the first stage is greater than that of the optical amplifying unit in another stage, it is possible to increase the signal components that have been reduced due to spontaneously emitted light in the first stage, and thus relatively reduce noise. As a result, the obtained signals including a high SN ratio are maintained in another stage, and thus it is possible to obtain a high SN ratio.

Third Exemplary Embodiment

<Multi-Stage Amplifier>

A multi-stage optical amplifier according to a third exemplary embodiment of the invention includes a plurality of optical amplifying units connected in series to one another to obtain a constant gain, and is characterized in that each of the optical amplifying units includes: a rare earth doped optical fiber amplifying circuit; an excitation light source that inputs excitation light to at least one of the input and output terminals of the rare earth doped optical fiber amplifying circuit; light receiving elements that are connected to the input and output terminals of the rare earth doped optical fiber amplifying circuit; and a control circuit that makes the difference between output signals from the two light receiving elements constant, and the control circuit of the optical amplifying unit in a first stage makes the gain of the optical amplifying unit in the first stage greater than that of an optical amplifying unit in another stage to prevent an increase in the amount of noise due to a reduction in the number of signal components caused by spontaneously emitted light.

According to the above-mentioned structure, since the gain of the optical amplifying unit in the first stage is greater than that of the optical amplifying unit in another stage, it is possible to increase the signal components that have been reduced due to spontaneously emitted light in the first stage, and thus relatively reduce noise. As a result, the obtained signals including a high SN ratio are maintained in another stage, and thus it is possible to obtain a high SN ratio.

Fourth Exemplary Embodiment

<Multi-Stage Amplifier>

A multi-stage optical amplifier according to a fourth exemplary embodiment of the invention includes a plurality of optical amplifying units connected in series to one another to obtain a constant gain, and is characterized in that each of the optical amplifying units includes: a rare earth doped optical fiber amplifying circuit; an excitation light source that inputs excitation light to at least one of the input and output terminals of the rare earth doped optical fiber amplifying circuit; light receiving elements that are connected to the input and output terminals of the rare earth doped optical fiber amplifying circuit; and a control circuit that makes the difference between output signals from the two light receiving elements constant. In addition, the multi-stage optical amplifier is characterized in that the control circuit of the optical amplifying unit in the first stage changes signal input power and the number of wavelengths on the basis of the initial value of the gain of each optical amplifying unit, sets the gain to the initial value when signal output power is equal to an expected value, increases the gain when the signal output power is less than the expected value, and decreases the gain when the signal output power is more than the expected value, thereby preventing an increase in the amount of noise due to a reduction in the number of signal components caused by spontaneously emitted light.

According to the above-mentioned structure, since the gain of the optical amplifying unit in the first stage is greater than that of the optical amplifying unit in another stage, it is possible to increase the signal components that have been reduced due to spontaneously emitted light in the first stage, and thus relatively reduce noise. As a result, the obtained signals including a high SN ratio are maintained in another stage, and thus it is possible to obtain a high SN ratio.

Fifth Exemplary Embodiment

<Method of Controlling Multi-Stage Amplifier>

A method of controlling a multi-stage amplifier to obtain a constant gain according to a fifth exemplary embodiment of the invention is characterized in that the gain of an amplifying unit in a first stage is greater than that of an amplifying unit in another stage to prevent an increase in the amount of noise due to a reduction in signal components caused by spontaneously emitted light.

According to the above-mentioned structure, since the gain of the amplifying unit in the first stage is greater than that of the amplifying unit in another stage, it is possible to increase the signal components that have been reduced due to spontaneously emitted light in the first stage, and thus relatively reduce noise. As a result, the obtained signals including a high SN ratio are maintained in another stage, and thus it is possible to obtain a high SN ratio.

Sixth Exemplary Embodiment

<Method of Controlling Multi-Stage Amplifier>

A method of controlling a multi-stage amplifier to obtain a constant gain according to a sixth exemplary embodiment of the invention is characterized in that a control circuit of an optical amplifying unit in a first stage changes signal input power and the number of wavelengths on the basis of the initial value of the gain of each optical amplifying unit, sets the gain to the initial value when the signal output power is equal to an expected value, increases the gain when the signal output power is less than the expected value, and decreases the gain when the signal output power is more than the expected value, thereby preventing an increase in the amount of noise due to a reduction in the number of signal components caused by spontaneously emitted light.

According to the above-mentioned structure, since the gain of the optical amplifying unit in the first stage is greater than that of the optical amplifying unit in another stage, it is possible to increase the signal components that have been reduced due to spontaneously emitted light in the first stage, and thus relatively reduce noise. As a result, the obtained signals including a high SN ratio are maintained in another stage, and thus it is possible to obtain a high SN ratio.

That is, according to the above-described embodiments of the invention, it is possible to prevent the deterioration of a noise factor by adding the noise correction amount of spontaneously emitted light to the gain of a first-stage optical amplifying unit that performs constant gain control. In addition, an EDF in the first stage corrects the deterioration of signal light. Therefore, particularly, when the number of wavelengths is small or when input power around a channel is low, it is possible to prevent an increase in noise factor.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined claims.

The invention can be used for wavelength division multiplexing optical transmission systems using WDM optical amplifiers, and apparatuses using multi-stage optical amplifiers, such as linear repeaters.

DESCRIPTION OF THE EXAMPLE

First Example

<Multi-Stage Amplifier>
(Characteristics of the Invention)

The present invention relates to a wavelength division multiplexing optical transmission system using an optical amplifier, and is characterized in that a multi-stage optical amplifier prevents an increase in noise factor due to spontaneous emission noise during constant gain control.

FIG. 1 is a conceptual diagram illustrating a multi-stage optical amplifier according to a first example of the invention.

In FIG. 1, in an optical amplifying unit 1, when signal light is incident on an EDF 10, excitation light is supplied from an excitation LD 13 to amplify the signal light, and the amplified signal light is output. The optical amplifying unit makes the difference between an output signal from a light receiving element 14 that measures the input power of a light input unit 11 and an output signal from a light receiving element 15 that measures the output power of a light output unit 12 constant, thereby realizing constant gain control. Meanwhile, in FIG. 1, a control circuit is not shown.

Optical amplifying units 2 and 3 perform the same operation as described above.

The optical amplifying unit 1, the optical amplifying unit 2, and the optical amplifying unit 3 form a multi-stage optical amplifier 100. In the multi-stage optical amplifier 100, when constant gain control is performed with total power, the signal light is deteriorated due to spontaneous emission noise generated from the EDF. Therefore, a gain corresponding to the signal light deteriorated due to spontaneous emission noise is corrected. During the gain correction, an increase in noise factor is prevented by increasing the excitation light supplied from the excitation LD 13 to obtain a signal light gain required for the light output unit 12. In this way, in the invention of the present application, the gain of the optical amplifying unit in the first stage is increased to prevent the deterioration of signal light caused by the optical amplifying unit. As a result, it is possible to prevent an increase in noise factor due to the spontaneous emission noise.

(Structure of Components)

FIG. 1 shows the multi-stage optical amplifier 100 according to an example of the invention.

In FIG. 1, in the optical amplifying unit 1, when signal light is incident on the EDF 10, excitation light is supplied from the excitation LD 13 to amplify the signal light, and the amplified signal light is output. The optical amplifying unit makes the difference between an output signal from the light receiving element 14 that measures the input power of the light input unit 11 and an output signal from the light receiving element 15 that measures the output power of the light output unit 12 constant, thereby realizing constant gain control.

The amplifying units 2 and 3 perform the same operation as described above.

It is assumed that a certain loss is inserted between the optical amplifying units 1 and 2 and between the optical amplifying units 2 and 3. In the multi-stage optical amplifier 100, signal light is deteriorated due to spontaneous emission noise generated from the EDF 10, an EDF 20, and an EDF 30. In this case, the excitation light that is supplied from the excitation LD 13 to increase the gain of the optical amplifying unit 1 is increased to obtain the gain of signal light required for the light output unit 12, thereby preventing an increase in noise factor.

FIG. 2 is a diagram illustrating the detailed structure of the optical amplifying unit 1 shown in FIG. 1.

In FIG. 2, since a necessary increase in gain depends on input power, a control circuit 16 controls a current source 17 on the basis of the input power detected by the light receiving element 14 to change a current value supplied to the excitation LD 13. In this case, when the gain of the optical amplifying unit 1 is less than an expected gain, the control circuit increases the current value supplied to the excitation LD 13. On the other hand, when the gain of the optical amplifying unit 1 is more than the expected gain, the control circuit decreases the current value supplied to the excitation LD 13. The optical amplifying unit 2 makes the difference between an output signal from a light receiving element 24 that measures input power and an output signal from a light receiving element 25 that measures output power constant, thereby realizing constant gain control. The optical amplifying unit 3 makes the difference between an output signal from a light receiving element 34 that measures input power and an output signal from a light receiving element 35 that measures output power constant, thereby realizing constant gain control. This is because this structure can perform control easier and prevent an increase in noise factor more effectively than the structure that calculates the gain increased in each optical amplifying unit.

In the above-mentioned structure, the excitation LD supplies only the forward excitation light, but it may supply only backward excitation light or both the forward excitation light and the backward excitation light.

In the above-mentioned structure, the excitation light supplied from the excitation LD may comprise a wavelength of about 980 nm or a wavelength of about 1480 nm.

In the above-mentioned structure, the EDF may be composed of an amplifying medium containing rare earth elements other than erbium.

Figure 3:
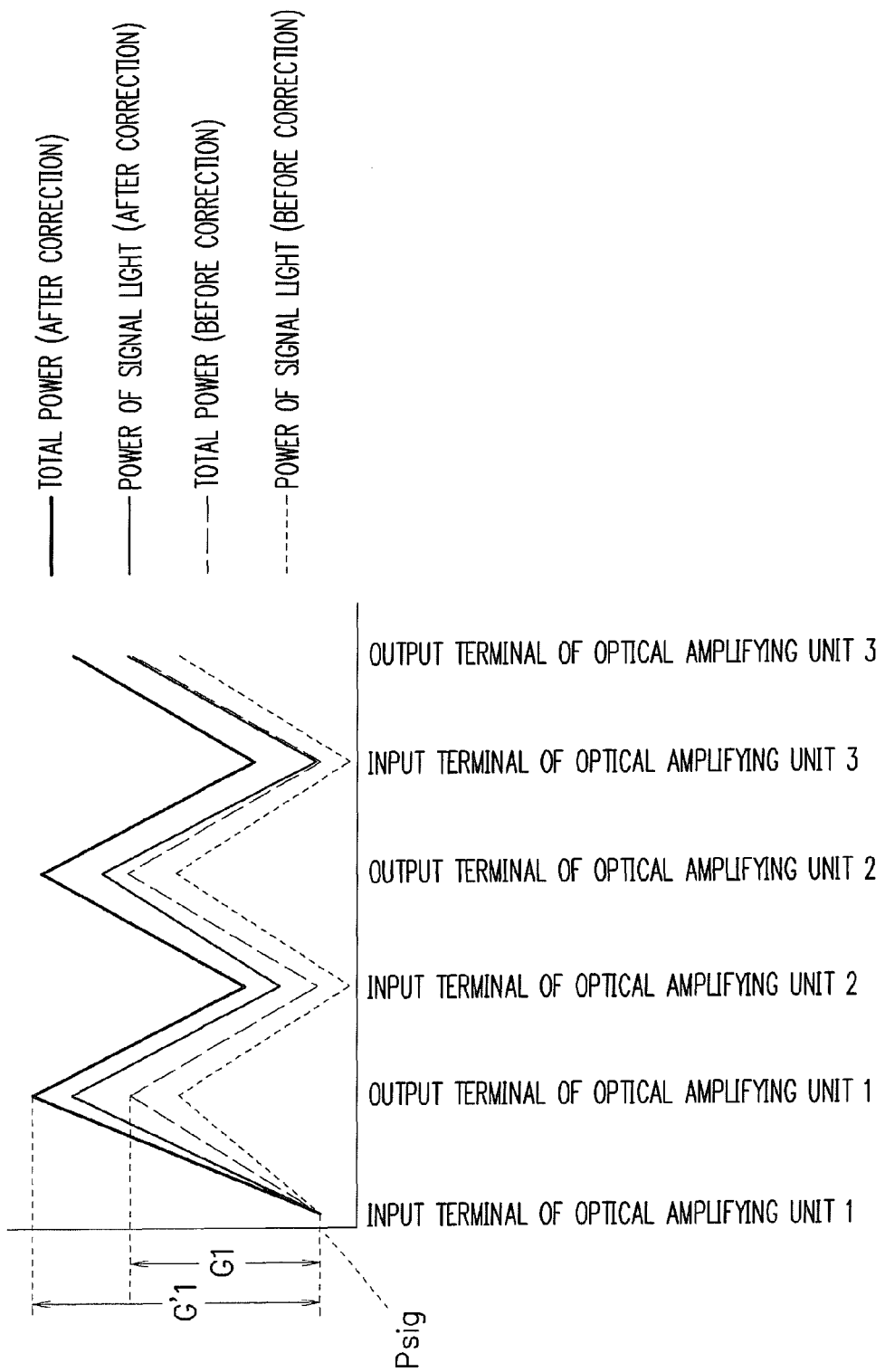
FIG. 3 is a diagram illustrating the operation of the multi-stage optical amplifier shown in FIG. 1.
Figure 4:
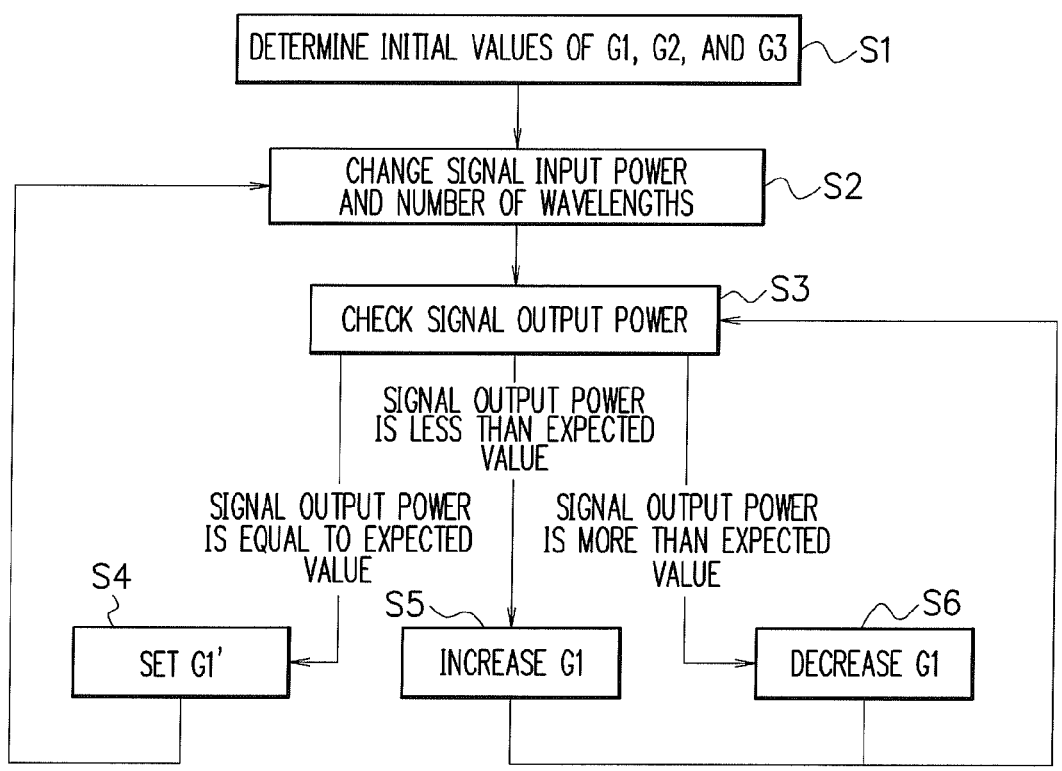
FIG. 4 is a flowchart illustrating a method of controlling a multi-stage optical amplifier according to the invention.

In the above-mentioned structure, the multi-stage optical amplifier is formed in a three-stage structure, but the invention is not limited thereto. For example, the multi-stage optical amplifier may be formed in a two-stage structure or a four or more stage structure. FIG. 3 is a diagram illustrating the operation of the multi-stage optical amplifier shown in FIG. 1. FIG. 4 is an example of flowchart illustrating an example of a method of controlling the multi-stage optical amplifier according to the invention. The operation of an optical amplifier performing constant gain control in the multi-stage optical amplifier shown in FIG. 1 will be described below.

The gain before and after the optical amplifying unit 1 is referred to as G1, the gain before and after the optical amplifying unit 2 is referred to as G2, and the gain before and after the optical amplifying unit 3 is referred to as G3. Meanwhile, an initial gain before and after the optical amplifying unit 1 is referred to as G1' (Step S1).

Signal input power and the number of wavelengths of each optical amplifying unit are changed (Step S2).

Signal output power is checked (Step S3).

When the signal output power is equal to an expected value, G'1 is set as the gain (Step S4). When the signal output power is less than the expected value, the gain is increased (Step S5). When the signal output power is more than the expected value, the gain is decreased (Step S6). In this way, it is possible to prevent an increase in noise due to a reduction in signal components caused by spontaneously emitted light.

When a loss between the optical amplifying units 1 and 2 is L12 and a loss between the optical amplifying units 2 and 3 is L23, the gain of the optical amplifier is G1−L12+G2−L23+G3.

When signal light Psig is input, total output power before correction is represented by Expression 1 given below:

$$Ptotal = Psig + G1 - L12 + G2 - L23 + G3 \qquad (1)$$

In this case, when the power of spontaneous emission noise generated from the optical amplifying unit 1 is Pase1, the power of spontaneous emission noise generated from the optical amplifying unit 2 is Pase2, and the power of spontaneous emission noise generated from the optical amplifying unit 3 is Pase3, the output power of signal light is represented by Expression 2 given below:

$$Psig + G1 - L12 + G2 - L23 + G3 - (Pase1 + Pase2 + Pase3)G3 \qquad (2)$$

When $G1' = G1 + Pase1 + Pase2 + Pase3$, the output power of signal light can be Ptotal.

It is possible to obtain the desired output power of signal light by changing G2 and G3. However, increasing the gain of the optical amplifying unit in the first stage can prevent an increase in noise factor more effectively.

The actual simulation results are as follows.

When G1=20 dB, G2=10 dB, G3=18 dB, L12=4 dB, L23=12 dB, Psig=−30 dBm, and the target value of signal output power is +2 dBm, the output power of signal light is −4.5 dBm, and the power of spontaneous emission noise is +0.9 dBm. In this state, when G1 is changed to obtain the target value of the output power of the signal light, a noise factor is 6.7 dB. When G2 is changed to obtain the target value of the output power of the signal light, a noise factor is 7.9 dB. When G3 is changed to obtain the target value of the output power of the signal light, a noise factor is 8.4 dB.

EFFECTS OF THE INVENTION

As described above, the invention has the following effects.

First, in the case of an optical amplifier performing constant gain control, when the gain of an optical amplifying unit in the first stage is fixed and input power becomes low, the gain of signal light is decreased, which results in remarkable deterioration of a noise factor. However, when the input power is low, it is possible to improve transmission characteristics by increasing the gain.

Second, in the case of an optical amplifier performing constant gain control, the maximum output of an excitation LD is dominated by the maximum value of output power. However, in the structure according to the invention, since the amount of spontaneous emission noise is reduced, it is possible to reduce the maximum output of an excitation LD required to obtain a necessary signal gain.

What is claimed is:

1. A multi-stage optical amplifier comprising:
a plurality of optical amplifying units that are connected in series to one another to obtain a constant gain, wherein each of the optical amplifying units includes:
a rare earth doped optical fiber amplifying circuit;
an excitation light source that inputs excitation light to at least one of an input terminal and an output terminal of the rare earth doped optical fiber amplifying circuit;
light receiving elements that are connected to the input and output terminals of the rare earth doped optical fiber amplifying circuit; and
a control circuit that makes the difference between output signals from the two light receiving elements constant,
wherein the control circuit of the optical amplifying unit in a first stage makes the gain of the optical amplifying unit in the first stage greater than that of an optical amplifying unit in another downstream stage to prevent deterioration of signals due to spontaneous emission noise.

* * * * *